Figure 1:
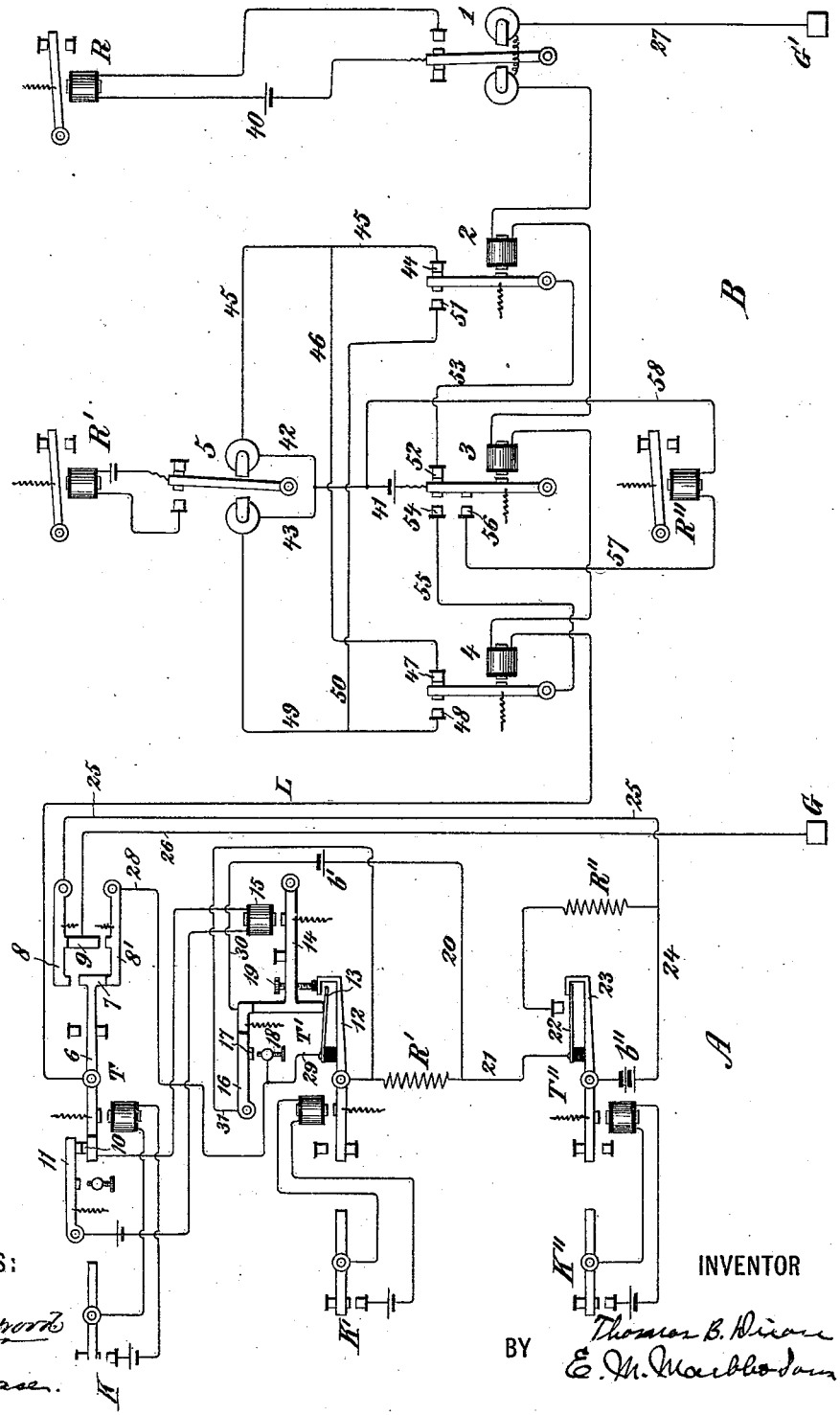

(No Model.)  3 Sheets—Sheet 1.

T. B. DIXON.
MULTIPLE TELEGRAPHY.

No. 549,709.  Patented Nov. 12, 1895.

WITNESSES:  INVENTOR
  Thomas B. Dixon
BY
  ATTORNEYS (No Model.)　　　　　　　T. B. DIXON.　　　　3 Sheets—Sheet 2.
MULTIPLE TELEGRAPHY.
No. 549,709.　　　　　　　　　Patented Nov. 12, 1895.
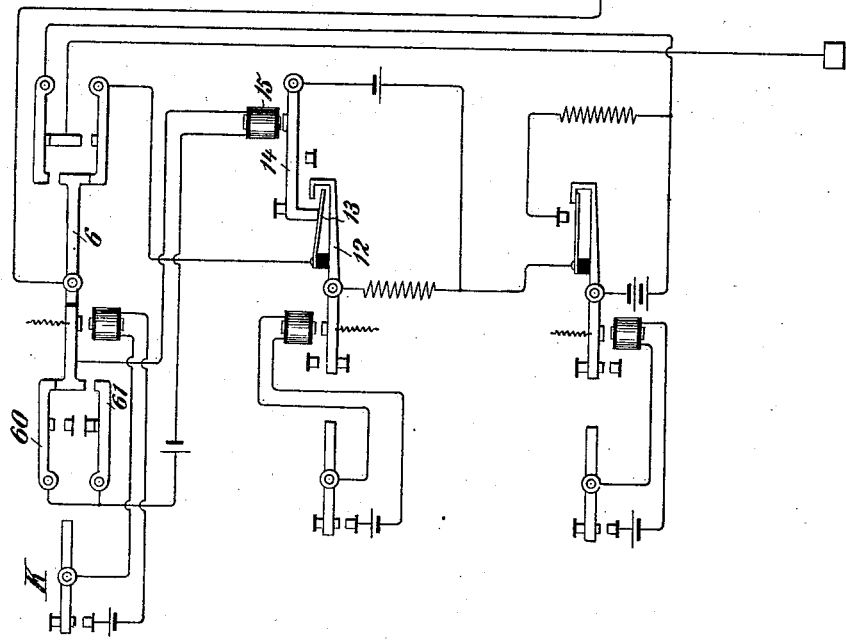
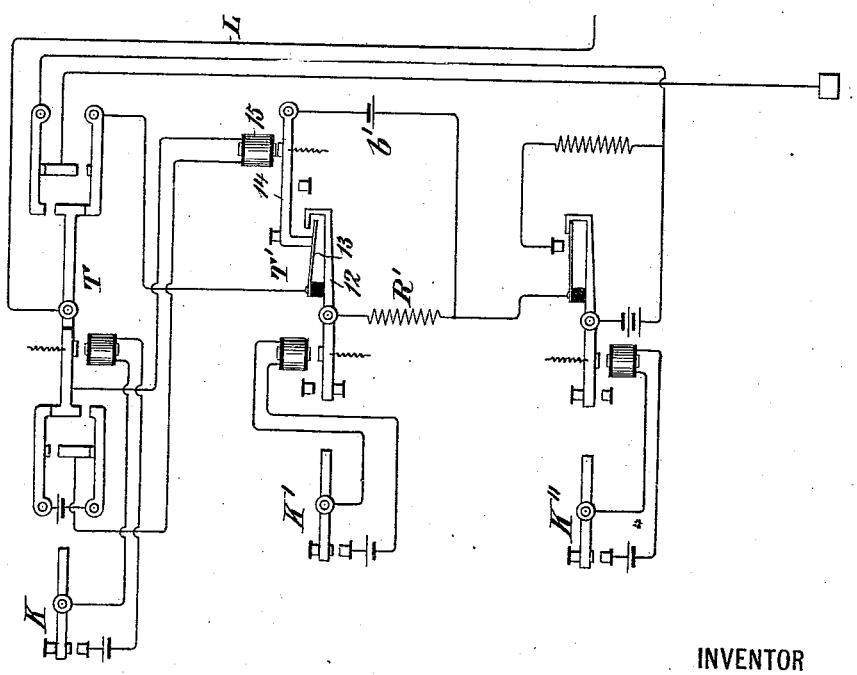
WITNESSES:　　　　　　　　　　　　　　　　　　INVENTOR
　　　　　　　　　　　　　　　　　　　　　　　Thomas B. Dixon
　　　　　　　　　　　　　　　　　　　　　BY
　　　　　　　　　　　　　　　　　　　　　　　　　ATTORNEYS

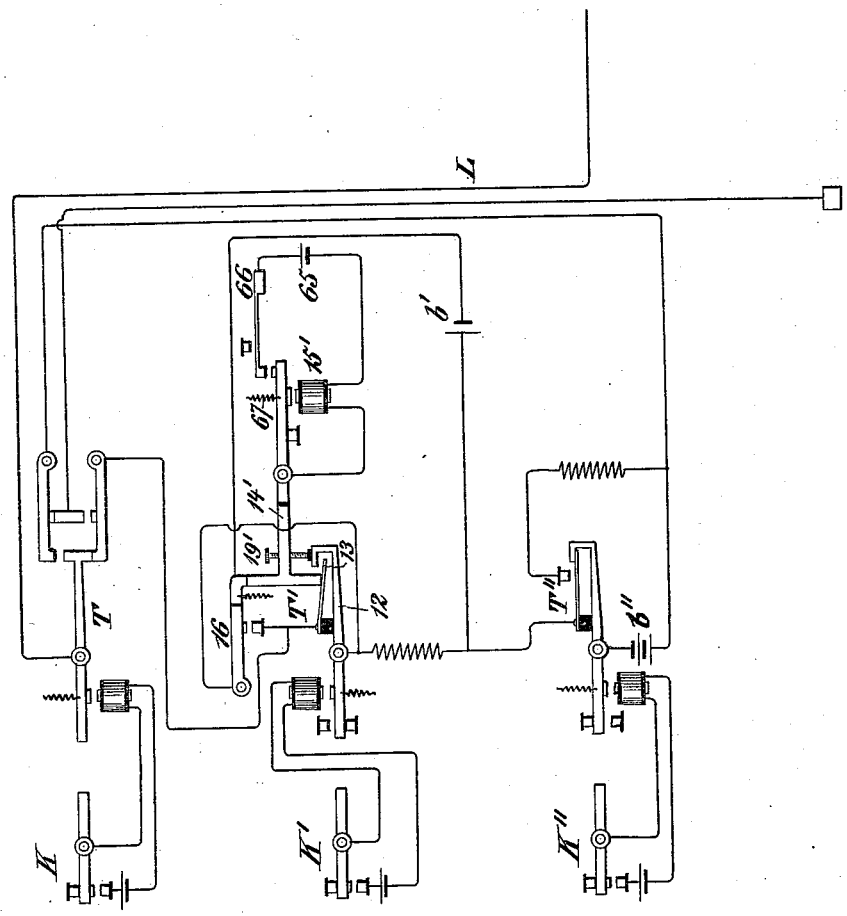

UNITED STATES PATENT OFFICE.

THOMAS BULLITT DIXON, OF HENDERSON, KENTUCKY.

MULTIPLE TELEGRAPHY.

SPECIFICATION forming part of Letters Patent No. 549,709, dated November 12, 1895.

Application filed September 12, 1895. Serial No. 562,261. (No model.)

*To all whom it may concern:*

Be it known that I, THOMAS BULLITT DIXON, a citizen of the United States, residing at Henderson, in the county of Henderson and State of Kentucky, have invented certain new and useful Improvements in Multiple Telegraphy; and I do hereby declare the following to be a full, clear, and exact description of the invention, such as will enable others skilled in the art to which it appertains to make and use the same.

My invention relates to systems of multiplex telegraphy whereby two or more distinct and separate messages are transmitted over a single line-wire, and is an improvement upon the system of multiplex telegraphy described in Letters Patent issued to me on August 6, 1895, No. 543,984, in that by it I am enabled to reduce the number of line-batteries employed for transmitting messages, the number of line-batteries required for transmitting messages in one direction being less by one than the number of transmitters employed for that direction, so that the current-potential in the line-conductor need never be as high as has been inevitable for transmitting the same number of messages in former systems of telegraphy, which require a separate battery for each transmitter. In former systems requiring a separate battery for each transmitter, when all of the batteries are put to the line current-potential becomes so high as to interfere seriously with the operation of sextuplex systems, because of the leakage of current and other well-known objections and practically to prevent their use, as well as to prevent the use of systems transmitting a greater number of messages than six. By my invention I am able to operate a sextuplex system with no greater number of line-batteries and no greater potential in the line than is employed with quadruplex systems and to operate a quadruplex system with no greater current-potential than is used for duplex systems. I am also able to simplify the receiving mechanism required in the system over that shown in my above-mentioned patent.

My invention consists in the novel means whereby I am enabled to transmit messages with a less number of line-batteries than there are transmitters, in the novel means employed for operating the pole-changing transmitting and receiving instruments in connection with current-varying transmitters and receivers without increase in current strength or potential over that required for operating the current-varying instruments independent of the pole-changing instruments, in the novel construction of certain of the transmitting-instruments, in the novel means employed for controlling the receiving-instruments so that each receiving-instrument shall be operated by its corresponding transmitter only, and in the novel means employed for preventing mutilation of the signals given by the receiving-instruments.

In the drawings accompanying this application the circuits and instruments are shown as arranged for transmitting signals in one direction only over a line conductor, transmitting-instruments being placed at one end of the line and receiving-instruments at the other end of the line. By combining the circuits shown in the drawings with any of the well-known systems of duplex telegraphy for transmitting signals in opposite directions over a line conductor my system may be adapted for transmitting signals in both directions. In the drawings the circuits and instruments shown are adapted for sending three messages in one direction—that is, the circuits shown when combined with the duplex system would constitute a sextuplex system. My system may be used as a quadruplex system only by omitting one of the current-varying transmitters and its corresponding receiver; or, if desired, by using a greater number of transmitters and receivers my system may be made an octuplex system, the system being capable, theoretically, of indefinite extension, its extension being limited only by the degree of potential allowable in the line-circuit and by the number of line-relays at the receiving-station which it is practicable to use.

The objects of my invention are, first, to provide a system of telegraphy in which two or more than two distinct messages may be transmitted in the same direction over a single wire, and which may be combined with well-known methods of double transmission of messages in opposite directions, so that an equal number of messages may be transmitted at the same time in the opposite direction over the same line-wire and without confusion or mutilation of signals; second, to provide means for so operating each receiving-instrument that it may be operated by its corresponding transmitter only and may be operated by that transmitter whether other transmitters are operated simultaneously therewith or not; third, to provide a system of multiplex telegraphy which may require a smaller number of line-batteries than the number of transmitters used, and consequently a smaller potential in the line-circuit for the number of messages transmitted than has been customary with former systems; fourth, to provide means for operating the pole-changing transmitters and receivers without increase in the current strength or potential over that required for the operation of the current-varying instruments independent of the pole-changing instruments; fifth, to provide suitable transmitting-instruments for operating the circuits of the system and to make these transmitting-instruments as simple as possible; sixth, to simplify the circuits and instruments at the receiving stations which control the receiving-instruments and to so arrange these circuits and instruments that mutilation of the signals of the receiver may be prevented, so that each signal given may be as distinct when all the transmitters are operating as though it were the only signal being transmitted over the line, and, seventh, to make the construction and arrangement of the circuits and instruments of this system as simple as possible, to provide for wide ranges of adjustment, and to render the system free from liability to derangement. These objects are attained in the system of telegraphy herein described, and illustrated in the drawings which accompany and form a part of this application, in which the same reference letters and numerals indicate the same or corresponding parts, and in which—

Figure 1 is a diagrammatic view illustrating the application of my system for the transmission of three signals simultaneously in one direction over a single line-wire, and Figs. 2, 3, and 4 are similar views illustrating different modified arrangements of the transmitting-instruments and circuits, the modification shown in these figures having the advantage of greater simplicity than the arrangement of the transmitting-instruments shown in Fig. 1, but having a smaller range of adjustability.

In the drawings, A is the transmitting-station, and B the receiving-station.

T, T', and T'' are the transmitting-instruments, which, as is ordinarily the case, are operated by electromagnets placed in local circuits controlled by hand-keys K, K', and K'', respectively.

T is a pole-changing transmitter, and T' and T'' are current-varying transmitters having batteries $b'$ and $b''$ of unequal strength. By throwing the batteries into and out of the line the transmitters are enabled to vary the current-strength of the line. Transmitter T'' is of ordinary construction, battery $b''$ being normally to the line, and the transmitter is arranged to throw the battery out of the line when its key K'' is depressed. Transmitter T' is likewise arranged to keep its battery $b'$ to the line normally and to throw the battery out of circuit when its key K' is depressed, but is of special construction, the details of which will be hereinafter pointed out.

R, R', and R'' are receiving-instruments of the ordinary type.

L is a line conductor connecting the transmitting and receiving stations.

1 is a polar relay of ordinary construction, which is placed in the line-circuit and which controls receiver R. 2, 3, and 4 are neutral relays of ordinary construction, likewise placed in the line-circuit and which control receiving-instruments R' and R''.

Relays 2, 3, and 4 correspond to similar relays in the system of telegraphy described in my former patent above mentioned, and, as described in said patent relays 2, 3, and 4, are of unequal sensitivenesses, relay 4 being sufficiently sensitive to respond to the current-strength of battery $b'$ only, relay 3 responding only to currents equal to or greater than the current of battery $b''$, and relay 2 responding only to the combined strengths of batteries $b'$ and $b''$.

5 is a dead-beat relay such as is described in my former patent—that is, it is a relay having an armature mounted between the poles of two independent magnets, so that when the circuit of one magnet is completed the armature is deflected toward the pole of that magnet and there remains after the circuit of the magnet is broken and until the circuit of the other magnet is completed, when it is deflected toward the pole of that magnet. As is explained in said patent, the dead-beat relay may be a polar relay having its magnets disconnected from each other and connected with circuits in the manner shown in the drawings, but is not necessarily a polar relay, since it is not required that the armature should be magnetized.

Transmitting-instrument T resembles ordinary pole-changing transmitters in that it has a pivoted armature-lever 6, provided with suitable stops and with the contact-piece 7, adapted to make contact alternately with continuity-preserving contact-levers 8 and 8', which levers are likewise adapted to make contact with a common stationary contact-piece 9. The armature-lever 6 carries a contact-point 10, insulated from the remainder of the armature-lever and engaging with a continuity-preserving contact-lever 11, having a suitable adjustable stop. The adjustment of this stop should be such that the lever breaks contact or closes contact, as the case may be, at the instant when the pole-changing contact-points on the other end of lever 6 reverse the polarity in the line.

The transmitter T' is of ordinary construction in that it has a pivoted armature-lever 12, carrying a spring contact-tongue 13, insulated from the lever 12. Engaging with this contact-tongue 13 is a pivoted armature-lever 14, controlled by a magnet 15 in a local circuit controlled by contact-lever 11 and contact-point 10 of transmitter T. A pivoted contact-lever 16 engages with lever 14 and has a contact-point 17, insulated from that part of the lever engaging with lever 14, which is adapted to make contact with a contact-point 18. Lever 14 carries a set-screw 19, which engages with but is insulated from the lever 12.

In the drawings transmitters T, T', and T'' are shown in their normal position, keys K, K', and K'' being open and batteries $b'$ and $b''$ being to the line. Current from the positive pole of battery $b'$ passes through conductors 20 and 21, contact-tongue 22 of transmitter T'', the armature-lever 23 of said transmitter T'', through battery $b''$, and through conductors 24 and 25 to the contact-lever 8 of pole-changing transmitter T, thence through contact-piece 9 and conductor 26 to ground at G, thence through the earth to ground connection G' at station B, through conductor 27, the magnets of polar relay 1, and thence through the coils of line neutral relays 2, 3, and 4 to line conductor L, which leads to armature-lever 6 of pole-changing transmitter T at station A, thence through the contact-lever 8', conductor 28, conductor 29, contact-tongue 13 of transmitter T', armature-lever 14, contact-lever 16, and through conductor 30, connected therewith, to the negative pole of battery $b'$. It will be seen, therefore, that normally the circuits of both batteries $b'$ and $b''$ are to the line and the line-circuit is complete. If key K of pole-changing transmitter T be depressed while batteries $b'$ and $b''$, or either of them, are to the line, the transmitter is operated and the direction of current in the line is reversed, thus operating polar relay 1 at station B, and when key K is released transmitter T returns to normal, restoring the current in the line to its first direction, and so deflecting back to its normal position the armature of relay 1. When key K is depressed also, the contact between lever 11 and contact-point 10 is broken, thus de-energizing magnet 15 and releasing armature-lever 14, which is now supported by contact-tongue 13 and set-screw 19, resting upon the end of armature-lever 12, since key K' is up and armature-lever 12 is therefore away from its magnet. The adjustment of stop 19 is such that lever 14 cannot descend sufficiently far to permit lever 16 to make contact with stop 18 so long as the lever 12 is away from its magnet. Therefore by this operation the circuit of battery $b'$ is not disturbed, and it will be seen that when key K' is up the operation of the circuit of magnet 15 and the release of armature-lever 14 of said magnet have no effect upon the line-circuit.

When key K' is depressed, key K being in normal position, contact is broken between tongue 13 and lever 14 by the movement of lever 12. The effect of this is to throw battery $b'$ out of the line-circuit to break contact between contact-lever 14 and tongue 13 and to make contact between tongue 13 and lever 12, causing current from battery $b''$ to pass from tongue 13, through armature-lever 12 and through resistance-coil R', to conductor 21, as before—that is, to cause the current of battery $b''$ to pass through resistance-coil R' instead of through battery $b'$, which is now out of circuit. Resistance-coil R' has the same resistance as battery $b'$ and is used to keep the resistance in the line the same, and so to preserve balance in the line. It will be seen that the operation of transmitter T' has no effect on battery $b''$. The throwing out of the circuit of battery $b'$ so reduces the line-current, however, that the armature of line-relay 2 at station B is no longer held by its magnet, thus causing, as will be seen hereinafter, the operation of receiver R'.

Transmitter T'', as has been already stated, is an ordinary transmitter, and therefore when its key is depressed battery $b''$ is thrown out of the line and resistance-coil R'' is thrown into the line. The throwing out of the line of battery $b''$ de-energizes the magnets of relays 2 and 3 and causes their armatures to move to their back-stops, and if battery $b'$ be likewise out of the line then there is no line-current and the magnet of relay 4 is likewise de-energized.

So long as either battery $b'$ or $b''$ is to the line the operation of transmitter T, by reversing the current in the line, causes the operation of polar relay 1. When both battery $b'$ and $b''$ are out of the line, owing to the depression of keys K' and K'', however, there is then no current in the line, and if the transmitter T is to be operated at such an instant some source of current must be supplied for the line. In my former system this was done by providing a separate battery for transmitter T, weaker than the batteries of the other transmitters; but since it was necessary in this former system that the battery of one transmitter should be of a higher potential than the combined potential of the battery of the other transmitter or transmitters and of the special battery of the pole-changing transmitter when all the batteries were to the line in series, the line-potential became inconveniently great. By this invention I have obviated this difficulty and have made it possible to use batteries for the current-varying transmitters of much smaller potential than was possible in my former system, at the same time doing away with the special battery of the pole-changing transmitter. Current is supplied to the line for operating polar relay 1 when both batteries $b'$ and $b''$ are out of the line by causing transmitter T, at the instant when it has reversed the line polarity, to throw into the line-circuit for but a brief instant a battery, as $b'$. This battery, which need not necessarily be battery $b'$, but may be so conveniently, is kept in the line-circuit for too brief a time to operate receiver R', the arrangement of relays 2, 3, 4, and 5, as will be hereinafter explained, being such as to prevent mutilation of signals of receiver R' even if the magnets of line-relays should cause their armatures to make a slight kick; but this brief current is of sufficient duration to affect the extremely-sensitive relay 1, and being in the opposite direction from the current which last flowed through the line before polarity was reversed the armature of relay 1 is deflected toward the right of Fig. 1. This brief pulsation of current is obtained by means of contact-points 10 and 11 of lever 6, magnet 15, its armature-lever 14, contact-lever 16, and the circuits connected therewith, in the following manner: Supposing keys K' and K'' to be depressed, batteries $b'$ and $b''$ are out of the line-circuit, armature-lever 12 of transmitter T' is held by its magnet to its armature, and contact is broken between contact-tongue 13 and the armature-lever 14 of magnet 15. If at this instant key K be depressed, armature-lever 6 of transmitter T is attracted toward its magnet, contact is broken between contact-point 10 and contact-lever 11, and by the operation of the circuit-reversing device the polarity is reversed. The adjustment of the stop of contact-lever 11 is such that contact between contact-points 11 and 10 is broken at the instant of the reversal of the line polarity. The breaking of this contact de-energizes magnet 15, causing its armature-lever 14 to fall and make contact with contact-tongue 13, contact-lever 16 following the motion of lever 14. This motion of levers 14 and 16 completes the circuit of battery $b'$ an instant after the reversal of the line polarity has taken place and breaks contact between tongue 13 and lever 12, thereby throwing resistance-coil R' out of the line; but an instant after battery $b'$ has been thrown into the line in this manner the lever 16 comes in contact with its stop, so breaking contact between levers 16 and 14, again throwing battery $b'$ out of the line and throwing resistance-coil R' into circuit, since the line-circuit now runs from conductor 28, through contact-points 18 and 17, lever 16, and conductor 31, to resistance-coil R'. There is thus produced in the line a brief current, which commences an instant after the reversal of the line polarity and exists but for a brief instant, constituting a mere pulsation. Polar relay 1 being extremely delicate, as is ordinarily the case, this brief current is sufficient to operate the relay, and as the armature of the relay always stays in one position until it is positively moved into the other position by the reversal of the current of its magnet this operation of the relay is sufficient to operate its reciver R.

If while key K is depressed key K' or K'', or both, are released, thus restoring battery $b'$ or $b''$ to the line, the direction of the current in the line is still reversed and the armature of relay 1 remains against its right contact-potnt, neutral relays 2, 3, and 4 being operated, however, exactly as if the direction of the current were the normal direction. If while keys K' and K'' are still depressed and batteries $b'$ and $b''$ are out of the line key K is released, the armature-lever 6 of transmitter T moves away from its magnet and the line polarity is again reversed, being restored to normal condition. At the instant of this reversal of line polarity, however, contact is made between contact-lever 11 and contact-point 10, thus completing the circuit of magnet 15. The completion of this circuit causes lever 14 to rise and make contact with lever 16, thus throwing battery $b'$ into the line, but this time with the normal polarity—that is, with the current from the battery flowing in the direction to move the armature of relay 1 back to its left contact-point. Battery $b'$ remains in the line only until lever 14 has broken contact with contact-tongue 13, (it being remembered that armature-lever 12 is now in proximity to its magnet). The current from battery $b'$ which passes through the line when transmitter T returns to normal is therefore only a brief pulsation, like that which took place when key K was depressed, and is therefore too brief to operate neutral relay 4 sufficiently to cause the operation of dead-beat relay 5, although of sufficient duration to operate polar relay 1, while it is too weak to affect relays 2 and 3 at all.

Referring now to the receiving-instruments at station B, receiver R, corresponding to the transmitter T, is operated by a battery 40 and local circuit passing through the armature of relay 1 and the right-hand contact-point. Receivers R' and R'' are operated by a battery 41, the poles of which are connected to the armature of relay 3 and to branching conductors 42 and 43, leading to the right and left magnets, respectively, of dead-beat relay 5. The front contact 44 of relay 2 is connected by a conductor 45 to the right-hand magnet of relay 5 and by a conductor 46 to the front contact 47 of relay 4. The rear contact 48 of relay 4 is connected by a conductor 49 to the left-hand magnet of dead-beat relay 5 and by a conductor 50 to the rear contact 51 of relay 2. The front contact 52 of relay 3 is connected by a conductor 53 with the armature of relay 2, and the first rear contact 54 of relay 3 is connected by a conductor 55 with the armature of relay 4. A second rear contact 56 of relay 3 is connected by a conductor 57 with the magnet of receiver R'', and thence by a conductor 58 with the negative pole of battery 41.

It will be seen that normally a circuit is completed from battery 41 through the front contact of relays 3 and 2 and the right-hand magnet of dead-beat relay 5, thus holding the armature of relay 5 to the right. When relay 2 alone is de-energized, the circuit of relay 5 is broken, and the circuit through the left-hand magnet of relay 5 is completed through conductors 50 and 49 and the rear contact of relay 2, thus moving the armature of relay 5 to the left. If relays 2 and 3 are both de-energized, relay 4 being still energized, the circuit through the left-hand magnet of relay 5 is broken at the front contact 52 of relay 3. If relays 2 and 3 have been de-energized simultaneously, then the front contact 52 of relay 3 will have been broken before the rear contact 51 of relay 2 has been completed, or in any event before the contact 51 has been completed long enough to move the armature of relay 5 into contact with its left-hand contact-point, so as to operate receiver R', and therefore there can be no false operation of receiver R'. If relays 3 and 4 are de-energized after relay 2 has been de-energized, so that receiver R' has already been operated at the time of the breaking of contact 52, the armature of relay 5 is not moved and receiver R' is not affected, for although while the armatures of relays 3 and 4 are moving there is no current flowing through either magnet of relay 5 the armature of this relay will not move, and as soon as contact 49 and 48 is completed current again flows through the left-hand magnet of relay 5.

If relay 4 be de-energized simultaneously with relays 2 and 3 or if it be de-energized after relays 2 and 3 have been de-energized simultaneously, (under which circumstance, as above stated, the armature of relay 5 would remain in contact with its right contact-point,) the circuit through the left-hand magnet of relay 5 is completed through conductor 49, contact 48 of relay 4, conductor 55, and rear contact 54 of relay 3, thus operating relay 5 and receiver R'. Receiver R' is operated by a local circuit and battery controlled by relay 5.

When relay 3 is de-energized, a circuit is completed from battery 41 through its second rear contact 56, conductors 57 and 58, and the magnet of receiver R'', thus operating said receiver.

Relay 5 may serve as a receiver without any special receiver R', and relay 3 might serve as a receiver without any special receiver R''; but it is considered preferable to employ these special receiving-instruments, both because special receivers are more easy to read from and because it is probable that from time to time there will be slight false movements of the armatures of relays 3 and 5, not sufficient to cause operation of the special receivers R' and R'', but still sufficient to cause confusing clicks of relays 3 and 5, were they used as receivers.

The operation of the circuits of my system of telegraphy is as follows: The receiving and transmitting instruments being in positions shown in Fig. 1, and batteries $b'$ and $b''$ being to the line, if key K be depressed and transmitter T operated the line polarity will be reversed, thus deflecting the armature of relay 1 to the right, completing the local circuit of battery 40 and causing the operation of receiver R, neutral relays 2, 3, and 4 being unaffected by this reversal of polarity, since the current in the line is practically constant in strength. At the instant of the reversal of polarity a slight false movement of the armatures of neutral relays may take place; but such false movement may be corrected by the use of a condenser in the manner described in my former patent above referred to. In any case this false movement is not sufficient to complete a circuit through receiver R'' or through the left-hand magnet of relay 5. When key K is released, transmitter T returns to normal, restoring the line-current to its normal polarity and deflecting the armature of relay 1 to normal, thus breaking the circuit of battery 40 and restoring receiver R to normal.

When key K' is depressed, transmitter T being at normal position, transmitter T' is operated, and since contact-lever 14 is held upward by magnet 15 contact is broken between lever 14 and tongue 13 and at the same instant is completed between tongue 13 and armature-lever 12, thus throwing battery $b'$ out of the line and throwing the corresponding resistance-coil R' into the line, so that the line-circuit is not broken and the line-resistance remains constant. Throwing battery $b'$ out of the line, however, so reduces the line-potential that relay 2 is de-energized and rear contact 51 is closed, thus completing a circuit through the left-hand magnet of relay 5, deflecting the armature of the relay to the left, and operating receiver R'. When key K' is released, contact is broken between tongue 13 and lever 12 and is made between tongue 13 and lever 14, thus restoring battery $b'$ to the line, throwing resistance R' out of the line, and re-energizing relay 2, thus breaking the circuit through the left-hand magnet of relay 5, completing the circuit of the right-hand magnet of the relay, and restoring receiver R'.

When key K'' is depressed, battery $b''$ is thrown out of the line and resistance R'' is thrown into the line, the line-potential being so reduced thereby that relays 2 and 3 are de-energized and the circuit through the armature of relay 2 is broken at the front contact of relay 3, so that receiver R' is not affected by the operation of relays 2 and 3, and the circuit through receiver R'' is completed, operating the receiver. When key K'' is released, battery $b''$ is returned to the line, relays 2 and 3 are again energized, and receiver R″ is returned to normal. If while key K″ is depressed key K′ is also depressed, relay 4 is de-energized, and contact 48 is closed, completing a circuit through the left-hand magnet of relay 5 and operating receiver R′.

If while keys K′ and K″ are depressed, so that there is no current in the line, key K is depressed, so as to operate transmitter T, the line polarity is reversed and at the instant of reversal the circuit of magnet 15 is broken, permitting contact-lever 14 to drop and make contact with tongue 13 of transmitter T′, thus throwing battery $b'$ into circuit and throwing resistance R′ out of circuit. An instant after contact is made contact-lever 16 comes in contact with its stop 18 and breaks contact with the lever 14, thus again throwing battery $b'$ out of circuit and throwing resistance R′ into circuit. The brief pulsation of current thus produced in the line and in the direction opposite to the normal polarity of the line is not sufficient to cause the operation of receiver R′, but is sufficient to deflect the armature of the delicate polar relay 1 to the right, thus operating receiver R. If keys K′ and K″, or either of them, be released before key K is released, so as to place one of the transmitting-batteries on the line, reversal of line polarity, which takes place when key K is released, deflects the armature of relay 1 back to its former position in the ordinary manner; but if keys K′ and K″ are still depressed when key K is released at the instant when the reversal of line polarity takes place magnet 15 is energized and raises its armature-lever 14, which lever makes contact with lever 16, thus completing the circuit of battery $b'$, and an instant afterward breaks contact with tongue 13, thus throwing battery $b'$ again out of circuit. The pulsation of current thus produced, which is as brief as that produced when key K was depressed and which takes place an instant after the normal polarity has been restored, deflects the armature of relay 1 to the left, thus breaking the circuit of battery 40 and restoring receiver R to normal polarity.

The use of the dead-beat relay 5 to control the receiver R′ instead of a simple repeating relay prevents any possible mutilation of the signals of said receiver. In no case is receiver R″ subject to mutilation, because its circuit is controlled by relay 3 only; but the circuits of relay 5 are controlled by all three line-relays, and it is inevitable with the arrangement of contact points and circuits adopted that during a portion of the time while these relays are operating there shall be no current passing through the magnets of relay 5. The fact, however, that the mere breaking of the circuits of the magnets of relay 5 does not cause movement of the armature of the relay prevents false operation of the circuit of receiver R′ and so prevents mutilation of the signals. The dead-beat relay likewise acts to prevent possible disturbance of the signals of receiver R′ when battery $b'$ is thrown into the line momentarily to operate relay 1. In no case can relay 3 be operated by such throwing of battery $b'$ into the line, since the battery is not strong enough to affect it; but relay 2 or 4 may be momentarily affected, thus causing a slight movement of their respective armatures away from their front contact-points, breaking the circuit through the left-hand magnet of relay 5; but before relay 2 or 4 can close a circuit through the right-hand magnet of relay 5 battery $b'$ will have been again cut out of circuit, so that no disturbance of receiver R can follow.

In my former application above referred to I showed and described an arrangement of selecting relays with continuity-preserving contact-points which avoided mutilation of the signals of the first receiver; but the arrangement here shown, involving the use of the dead-beat relay, is much more simple and easy of adjustment than the arrangement shown in said application.

In Figs. 2, 3, and 4 are shown modified forms of transmitting-instruments for producing the pulsatory current required for the operation of the polar relay 1. In Fig. 2 an ordinary pole-changing mechanism is substituted for the contact-point 10 and contact-lever 11 of the transmitter T of Fig. 1, and the contact-lever 16 of transmitter T′ of Fig. 1 is dispensed with. When key K is depressed, after keys K′ and K″ have been depressed, transmitter T is operated, thus reversing the line polarity, and at the same instant reversing the current which flows through magnet 15 of transmitter T′. The relationship between magnet 15 and its armature-lever 14 is extremely delicate, so that the slight interruption of current at the instant of reversal may be sufficient to cause the armature-lever 14 to drop temporarily and so to make contact with tongue 13, thus throwing battery $b'$ into the line, and to break contact between tongue 13 and armature-lever 12, thus throwing resistance R′ out of the line. The almost instant reattraction of lever 14 throws battery $b'$ out of the line and throws resistance R′ into the line; but in this brief instant of contact a pulsation of current has passed over the line sufficient to operate the polar relay 1.

In Fig. 3 a somewhat similar arrangement is shown. In this case the armature-lever 6, when attracted to its magnet, is caused to break contact with a lever 60 and an instant thereafter to make contact with a second lever 61. Both of these levers are connected to the circuit of magnet 15 as the armature-lever 6. The breaking of contact between levers 6 and 60 causes lever 14 of magnet 15 to drop, making contact with tongue 13 and breaking contact between tongue 13 and lever 12. An instant after lever 6 makes contact with lever 61 and raises lever 14. A similar brief interruption of the circuit of magnet 15 takes place when key K is released.

In Fig. 4 is shown a still different arrangement of the parts of the transmitting-instruments. It is obvious that since the pulsatory currents which operate polar relay 1 are too brief to operate the neutral relays controlling receiver R' these currents in the line may be continuous without affecting the operation of the neutral relays. In Fig. 4 there is provided an automatic vibrator and circuit-interrupter such as is used on induction-coils, and which is arranged to continuously make and break the circuit of battery $b'$ when the armature-lever 12 of transmitter T' is in proximity to its magnet. So long as key K' is up the operation of this vibrator has no effect, since armature-lever 14' is held up by stop-screw 19' being in contact with lever 12; but when key K' is depressed and the armature-lever 12 is in proximity to its magnet the action of the vibrator is to throw battery $b'$ into the line continuously but for brief and rapidly-recurring instants. The vibrator may be of any usual construction. In the form shown a magnet 15' is arranged to vibrate a lever 14', and the circuit of a local battery 65 passes through the armature 14, and through a spring-tongue 66, adapted to make contact with a lever 14'. With this construction when the circuit of battery 65 is completed through contact-point 66 and lever 14' magnet 15' is energized and draws lever 14' away from contact-point 66, thus de-energizing magnet 15'. A retractile spring 67 then draws lever 14 back into contact with tongue 66. As shown in Fig. 4, the contact-lever 16 (shown also in Fig. 1) is used to operate with the tongue 13 and lever 14'; but instead of this the current from battery $b'$ may be passed through the lever 14' in the manner shown in Figs. 2 and 3.

The operation of the circuits and instruments of Fig. 4 is as follows: Keys K' and K'' being first depressed, when key K is depresed transmitter T operates and reverses the polarity in the line. At the next succeeding vibration of lever 14', which causes battery $b'$ to be put to the line for a brief instant, the armature of relay 1 at station B is deflected to the right. Succeeding pulsations of current have no effect on relay 1 while key K is depressed; but when key K is released the line polarity is restored to normal, and the first pulsation of current following such restoration deflects the armature of relay 1 to the left again. The arrangement shown in Fig. 4 has this advantage, that while the continuous pulsatory current does not tend to change the position of the armature of polar relay 1, except immediately after the operation of the transmitter T, it does operate to hold the armature of relay 1 and prevent any false movements thereof. Where several line conductors are in close proximity, it might happen that a current induced in conductor L from another conductor in close proximity thereto would cause a false movement of the armature of relay 1. The continuous pulsatory current, however, holds the armature in the position corresponding to the position of transmitter T.

It is obvious that it is not necessary that battery $b'$ in particular should be employed for producing the pulsations of current for operating polar relay 1 in any of the arrangements of transmitting-instruments shown in Figs. 1, 2, 3, and 4, but that a special battery might be employed, and, if necessary, suitable contact-points might be arranged to cut this special battery out of the line at all times when batteries $b'$ and $b''$ are to the line.

Having thus completely described my invention, what I claim, and desire to secure by Letters Patent, is—

1. In a system of multiple telegraphy, the combination, with a line conductor, means for supplying current to the line, a current varying transmitter adapted to vary the current strength in the line and a receiving instrument corresponding to said transmitting instrument and operated by variations in the line current produced thereby, of a pole changing transmitter arranged when operated to change the line polarity, a receiving instrument corresponding thereto and operated by reversal of the line polarity, and a pulsatory current producing device, arranged to produce in the line current pulsations of too brief duration to affect the receiver corresponding to said current varying transmitter, whereby the receiver corresponding to said pole changing transmitter may be operated independently of the operation of the current varying transmitter, substantially as described.

2. In a system of multiple telegraphy, the combination, with a line conductor, means for supplying current to the line, a current varying transmitter adapted to vary the current strength in the line, and a receiving instrument corresponding to said transmitting instrument and operated by variations in the line current produced thereby, of a pole changing transmitter arranged when operated to change the line polarity, a receiving instrument corresponding thereto and operated by reversal of the line polarity, a magnet operated by a circuit controlled by said pole changing transmitter, contact points controlled by said magnet, connected with a means for varying the line current, and arranged when said magnet is operated by said pole changing transmitter to vary for a brief instant the line current, whereby a current pulsation is produced in the line and the receiver corresponding to said pole changing transmitter may be operated independently of the operation of said current varying transmitter, substantially as described.

3. In a system of multiple telegraphy, the combination, with a line conductor, means for supplying current to the line, a current varying transmitter adapted to vary the current strength in the line, and a receiving instrument corresponding to said transmitting instrument and operated by variations in the line current produced thereby, of a pole changing transmitter arranged when operated to change the line polarity, a receiving instrument corresponding thereto and operated by reversal of the line polarity, a magnet operated by a circuit controlled by said pole changing transmitter, contact points controlled by said magnet and arranged to throw into the line for a brief instant, when operated, a source of current, whereby a current pulsation may be produced in the line and the receiver corresponding to said pole changing transmitter may be operated independently of the operation of said current varying transmitter, substantially as described.

4. In a telegraphic transmitter, the combination, with a contact lever and a contact piece carried thereby and insulated therefrom but arranged to make contact therewith, said contact lever and contact piece being arranged to be connected to a line conductor, of a second contact lever arranged to make contact with said contact piece and to break contact between said contact piece and first contact lever, adapted to follow the movement of said contact piece when said first contact lever moves, and arranged to be connected to a source of electric energy for the line, means for moving said first contact lever and contact piece away from said second contact lever, and a magnet arranged when energized to prevent said second contact lever from following said contact piece, substantially as described.

5. In a telegraphic transmitter, the combination, with a contact lever and a contact piece carried thereby and insulated therefrom but arranged to make contact therewith, said contact lever and contact piece being arranged to be connected to a line conductor, of a second contact lever arranged to make contact with said contact piece and to break contact between said contact piece and first contact lever, adapted to follow the movement of said contact piece when said first contact lever moves, and arranged to be connected to a source of electric energy for the line, means for moving said first contact lever and contact piece away from said contact lever, a magnet arranged when energized to prevent said second contact lever from following said contact piece, means for breaking the connection between said second contact lever and said source of electric energy, and means for completing the line circuit around said contact levers and contact piece when the connection between said second contact lever and said source of electric energy is broken, substantially as described.

6. In a telegraphic transmitter, the combination, with a contact lever and a contact piece carried thereby and insulated therefrom but arranged to make contact therewith, said contact lever and contact piece being arranged to be connected to a line conductor, of a second contact lever arranged to make contact with said contact piece and to break contact between said contact piece and first contact lever, and to follow the movement of said contact piece when said first contact lever moves, a third contact lever arranged to be connected to a source of electric energy for the line and to make contact with said second contact lever, means for moving said first contact lever and contact piece away from said second contact lever, a magnet arranged when energized to prevent said second contact lever from following said contact piece, means for breaking contact between said second and third contact levers when said second lever follows said contact piece, and contact points operated by said third contact lever and arranged to complete the line circuit around said first and second contact levers and contact piece when contact is broken between said second and third contact levers, substantially as described.

7. In a system of multiple telegraphy, the combination, with a line conductor, means for supplying current to the line, and two transmitting instruments each adapted when operated to vary the current strength of the line to a degree different from that by which the other transmitter varies the strength of said line current, of three line relays of different sensitivenesses, arranged to be operated respectively by the current strength produced when the first transmitter is operated, when the second transmitter is operated, and when both transmitters are operated together, a dead beat relay, circuits for operating said dead beat relay controlled both by said first and by said third line relays, each relay being arranged to cause the armature of said dead beat relay to be deflected to the one side or the other accordingly as the armature of the line relay is in proximity to its magnet or away therefrom, the circuits of said first line relay being arranged to be broken by said second line relay when the latter is operated, a receiving device operated by said dead beat relay, and a receiving device operated by said second line relay, substantially as described.

8. In a system of multiple telegraphy, the combination, with a line conductor, means for supplying current to the line, and two transmitting instruments adapted each when operated to vary the current strength of the line to a degree different from that by which the other transmitter varies the strength of said line current, of three line relays of different sensitivenesses, arranged to be operated respectively by the current strengths produced when the first transmitter is operated, when the second transmitter is operated, and when both transmitters are operated together, a dead beat relay, circuits for operating said dead beat relay controlled by said first and by said third line relays, each relay being arranged to cause the armature of said dead beat relay to be deflected to the one side or the other according as the armature of the line relay is in proximity to its magnet or away therefrom, and the circuits of the first line relay being broken and of the third line relay being closed by the second line relay, a receiving device operated by said dead beat relay, and a receiving device operated by said second line relay, substantially as described.

In testimony whereof I affix my signature in presence of two witnesses.

THOMAS BULLITT DIXON.

Witnesses:
CAROLINE E. DAVIDSON,
HARRY M. MARBLE.